> United States Patent Office 3,790,554
Patented Feb. 5, 1974

3,790,554
HEPTAPEPTIDE INTERMEDIATE TO GONADO-
TROPIN-RELEASING HORMONE
George Rogelio Flouret, Waukegan, Ill., assignor to
Abbott Laboratories, Chicago, Ill.
No Drawing. Filed Sept. 24, 1971, Ser. No. 183,691
Int. Cl. C07c 103/52; C07g 7/00; C08h 1/00
U.S. Cl. 260—112.5        8 Claims

ABSTRACT OF THE DISCLOSURE

The synthesis of the heptapeptide Ser-Tyr-Gly-Leu-Arg-Pro-Gly-amide carrying easily removable protective groups on the Ser, Tyr and Arg moieties is described; the correspondingly protected hexapeptide is used as the starting material. The heptapeptide, upon removal of any protective group on the amino-N of the serine moiety, is an important intermediate for the preparation of the gonadotropin-releasing hormone.

DETAILED DESCRIPTION OF THE INVENTION

Recent discovery of the aminoacid sequence of the gonadotropin (Gn)-releasing hormone (RH) has made it highly desirable to produce this substance on a practical scale in a purity sufficient to use the substance therapeutically in instances of hormone deficiencies and possibly as a regulating agent for the ovulation cycle in female warm-blooded animals. For instance, it has been found that small doses of Gn-RH administered by intravenous injections to female sheep in the anestrus cycle produces ovulation. The formula of the Gn-RH has been identified with the aminoacid sequence pyro-Glu-His-Trp-Ser-Tyr-Gly-Leu-Arg-Pro-Gly-NH$_2$ but in order to make such a large molecule from simple, single aminoacids, a considerable number of steps including several condensation reactions are required. In order to assure such condensations to take place at the desired sites, other active sites or functional groups on the molecule might be conveniently protected by some groups that can be removed at will.

A relatively simple method has now been devised to produce the desired aminoacid chain in surprisigly good yields. The new method involves a minimum of group-protecting and -removal reactions for such protective groups and employs a number of new intermediates which are important stepping stones for making Gn-RH and other peptides.

For the purpose of the present disclosure, it is to be understood that all aminoacids used herein are in their optically active L-form except for glycine.

The present invention is particularly concerned with the heptapeptide which is one of the precursors for making Gn-RH and carries protective groups on the active sites of the serine, tyrosine and arginine moieties that can be removed by simple methods, if desired, to make the unprotected heptapeptide or, if desired, after further peptide chain extension. It is another object of the present invention to provide a process for the preparation of a protected heptapeptide that may be used for chain extension to the correspondingly protected decapeptide which is a direct precursor to Gn-RH. It is a further object of this invention to provide a poly-protected heptapeptide that can be used without adding further protective groups as an intermediate to make the corresponding protected Gn-RH.

These and other objects are accomplished by providing

Y-(O-R)Ser-(O-R')Tyr-Gly-Leu- (N$^\omega$R'')Arg-Pro-Gly-NH$_2$    (I)

wherein , R' and R'' are protective groups that are removable by hydrogenation or treatment with hydrogen fluoride and Y is hydrogen or a protective group that can be removed from the peptide without affecting R, R' and R''; ordinarily, R is represented by tetrahydropyranyl, tert-butyl, acetyl, benzyloxycarbonyl or benzyl; R' is tetrahydropyranyl, tert.-butyl, acetyl, benzyloxycarbonyl, benzyl, triphenylmethyl or tosyl and R'' is nitro, tosyl, benzyloxycarbonyl, p-nitrobenzyloxycarbonyl or tetrachloro-isopropyloxyphthalyl which is used to substitute one of the hydrogen atoms in the amino group of the guanidine moiety in Arg; Y is hydrogen, tert.-butoxycarbonyl (BOC), o-nitrophenylsulfenyl, 2-(p-diphenyl)isopropyl-oxycarbonyl, benzyloxycarbonyl or phthalyl.

The protected heptapeptide of Formula I is prepared by reacting the N$^\alpha$-protected hexapeptide (O-R')Tyr-Gly-Leu-(N$^\alpha$-R'')Arg-Pro-Gly-NH$_2$ with Y-(O-R)Ser p-nitrophenyl ester (NPE) in an inert solvent; Y-(O-R)Ser is

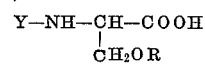

wherein Y is tert.-butyloxycarbonyl, benzoxycarbonyl, p-nitro- or p-methoxybenzyloxycarbonyl, 2 - (p-diphenyl)-isopropyloxycarbonyl, o-nitrophenylsulfenyl, phthalyl or trifluoroacetyl and R is selected from the above identified easily removable protective groups. The protective group Y can be removed by conventional methods to produce the heptapeptide carrying protective groups, R, R' and R''. This tri-protected heptapeptide (Formula I; Y is hydrogen) can be converted to the similarly protected decapeptide (R, R' and R'' are the same as above) by reacting it first with BOC-tryptophane NPE, removing the BOC group subsequently condensing the obtained octapeptide with N$^{Im}$-protected (or unprotected) histidine carrying a N$^\alpha$-protective group and after removing the latter, the formed triprotected nonapeptide is reacted with pyroglutamic acid pentachlorophenyl etser. The free decapeptide (or Gn-RH) can be obtained from the condensation product by treating it with hydrogen fluoride. During this reaction, the protective groups R, R' and R'' all are removed and replaced by hydrogen. Alternately, some commonly used protective groups can be removed by hydrogenation using a palladium catalyst.

In a more specific embodiment, the above-named protected hexapeptide wherein R' is benzyl and R'' is NO$_2$ dissolved in dimethylformamide at a concentration of between 0.1 and 1.0 molarity and a 0–50% excess over molarity of N$^\alpha$-tert.-butyloxycarbonyl-O-benzyl-serine p-nitrophenyl ester or a similarly N$^\alpha$- and O-protected ester of serine at a temperature between 0 and 30° C. After several hours, the reaction solution is evaporated and the residue dissolved in 15% methanol/chloroform and the solution is placed on a silica gel column. The column is eluted with chloroform containing increasing amounts of methanol until the desired heptapeptide appears in the eluate. The desired fractions of eluate are then combined and crystallized.

In order to prepare Gn-RH from the above material, the protective group Y is removed from the Ser moiety by any of the suitable methods known in the peptide art and the resulting triprotected heptapeptide is condensed first with BOC-Trp NPE, the BOC-group is removed. The resulting octapeptide is treated with N$\alpha$-BOC-histidine, the BOC-group is again removed and the formed nonapeptide reacted with pyroglutamic acid pentachlorophenyl ester. The resulting tri-protected decapeptide is then dissolved in an inert solvent and placed in a HF-resistant reaction vessel and treated there at a temperature between 0° and 30° C. with excess hydrogen fluoride. The excess hydrogen fluoride is removed after about one hour, the solvent is removed and the product is dried and purified. The Gn-RH prepared in this manner is highly active in biological tests showing luteinizing hormone-releasing activity in warm-blooded animals.

In order to make the hexapeptide used as the starting material for the present invention, the following reaction sequence is carried out: N-benzyloxycarbonyl-proline p-nitrophenyl ester is reacted with glycinamide, preferably with an excess of the latter over the equimolar amount, and the obtained N-benzyloxycarbonyl-prolylglycinamide is converted to the unprotected dipeptide by hydrogenation or acid tretament. The prolylglycinamide is then reacted with $N^\alpha$-benzyloxycarbonyl - $N^\omega$ - nitro-arginine to form a twice-protected tripeptide from which the benzyloxycarbonyl group is removed by acid treatment to furnish $N^\omega$-nitroarginyl-prolylglycinamide, hereinafter referred to as —($N^\omega$-$NO_2$)Arg-Pro-Gly-$NH_2$. The latter is reacted with N-tert.-butyloxycarbonyl-leucine p-nitrophenyl ester to produce a twice-protected tetrapeptide from which the tert.-butyloxycarbonyl group is removed by treatment with an acid to yield

Leu-($N^\omega$-$NO_2$)Arg-Pro-Gly-$NH_2$

This $NO_2$-protected tetrapeptide is reacted with N-tert.-butyloxycarbonylglycine p-nitrophenyl ester to a twice-protected pentapeptide from which the tert.-butyloxycarbonyl group is removed as in the case of the tetrapeptide to produce Gly-Leu - ($N^\omega$-$NO_2$) - Arg-Pro-Gly-$NH_2$. In turn, this pentapeptide is reacted with N-tert.-butyloxycarbonyl-O-benzyl-tyrosine p-nitrophenylester to produce a hexapeptide with three protective groups. The tert.butyloxycarbonyl group is removed by treatment of this material with trifluoroacetic acid/methylene chloride 1:1 to give the desired twice-protected hexapeptide (O-Bzl)Tyr-Gly-Leu-($N^\omega$-$NO_2$)Arg-Pro-Gly-$NH_2$.

The above mentioned condensation reactions are all carried out in the presence of an inert solvent such as dimethylacetamide or dimethylformamide or other organic liquids that do not react with either of the starting materials or the products of each step. Of course, it is to be understood that the above reaction sequence may be followed without using the specific protective groups named in each of the described stages. For instance, the benzyl group used to protect the free hydroxyl groups in tyrosine may be replaced by tetrahydropyranyl, tert.-butyl, acetyl, trifluoroacetyl, benzyloxycarbonyl, triphenylmethyl or tosyl; the nitro group protecting the amino group in the guanidine moiety of arginine may be replaced by converting the amino group to an amide or half-amide with a sulfonic or a carboxylic acid, e.g., tosyl, benzyloxycarbonyl or tetrachloroisopropyloxyphthalyl. In all instances, the protective groups, of course, should be chosen in such a way that they can easily be removed by one or more simple treatments which are mild enough as not to affect the peptide chain bonds. This is the case with all above mentioned protective groups and also includes the p-nitro-, p-methyl- and p-methoxy substituted derivatives of the listed groups containing a benzyl moiety.

If desired, the protective groups may be removed stepwise; for instance, where R and R' are the usual benzyl or substituted benzyl ethers, these groups may be removed by hydrogenation and subsequently, the protective group on the arginyl fragment can be removed by a suitable reaction step that does not affect the peptide links. Of course, such a reaction sequence may be reversed, if desired.

In order to show the preparation of the new heptapeptide, reference is made to the following examples which are to be understood as illustrations only and are not to be construed to limit the invention in any respect.

Example 1

A solution of 4.05 g. of (O-Bzl)Tyr-Gly-Leu-($N^\omega$-$NO_2$)-Arg-Pro-Gly-$NH_2$ in 12 ml. of dimethylformamide was treated with 4.16 g. of $N^\alpha$-tert.-butyloxycarbonyl-O-benzylserine p-nitrophenyl ester. The resulting solution was worked up after 16 hours of standing at room temperature by evaporating the dimethylformamide in vacuo and placing a solution of the crude, protected heptapeptide in 5% methanol in chloroform on 150 g. of silica gel.

The column was first eluated with 5% methanol in chloroform and then the desired compound was eluted with 15% methanol in chloroform. Evaporation of the methanol/chloroform solution afforded 5.07 g. of pure $N^\alpha$-BOC-(O-Bzl)Ser - (O-Bzl) - Tyr-Gly-Leu-($N^\omega$-$NO_2$)Arg-Pro-Gly-$NH_2$ which has an undefined melting point. The NMR spectrum was consistent with the structure and the elemental analysis was correct. The $R_f$ in 15% methanol in chloroform was 0.45 and $[\alpha]_D^{24}$—28.5° (c. 1; dimethylformamide).

Example 2

A solution of 1.5 g. of BOC-(O-Bzl)Ser-(O-Bzl)Tyr-Gly-Leu-($N^\omega$-$NO_2$)Arg-Pro-Gly-$NH_2$ in 20 ml. of trifluoroacetic acid/methylene chloride 1:1 was allowed to stand for 15 minutes at room temperature. The solution was evaporated, methylene chloride was added again and this step was repeated 5 times. The resulting dry material was dissolved in methanol and treated with an ion exchange resin (in the OH⁻ cycle). The suspension was filtered and the resin was eluted with methanol/acetic acid 9:1. The combined filtrate was evaporated to a dry powder which had an undefined melting point. The NMR spectrum and the elemental analysis confirm the expected aminoacid sequence: O-Bzl)Ser - (O-Bzl)Tyr - Gly-Leu-($N^\omega$-$NO_2$)Arg-Pro-Gly-$NH_2$ and the compound shows $R_f$ 0.15 in 15% methanol in chloroform (single spot).

To further characterize this material, the above compound was condensed with BOC-tryptophane NPE in a procedure similar to that described in Example 1 and the butyloxycarbonyl group was removed as described above. This reaction sequence was then repeated with BOC-histidine. The formed nonapeptide, still carrying protective groups R, R' and R" was then condensed with pyroglutamic acid pentachlorophenyl ester in dimethylformamide to the corresponding decapeptide. The condensation product was isolated from the reaction solution by evaporation, dissolution in methanol/chloroform and purification by chromatography, using chloroform with increasing amounts of methanol as the elute. The obtained decapeptide (Formula I wherein R=R'=benzyl, R"=$NO_2$, Y= pyro-Glu-His-Trp) was then treated with excess hydrogen fluoride acid using anisole as the scavenger. Work-up of the reaction mixture by known methods furnished the compound of Formula I wherein Y is pyro-Glu-His-Trp and R, R' and R" are hydrogen. This produce was found to be identical with a sample of natural Gn-RH.

By replacing the (O-Bzl)Tyr-Gly-Leu-($N^\omega$-$NO_2$)Arg-Pro-Gly-$NH_2$ used above with other hexapeptides of the same sequence but carrying other protective groups, the following heptapeptides are prepared in the same manner:

Y-(O-tBu)Ser-(O-Bzl)Tyr-Gly-Leu-($N^\omega$-$NO_2$)Arg-Pro-Gly-$NH_2$

Y-(O-Z)Ser-(O-Bzl)Tyr-Gly-Leu-($N^\omega$-$NO_2$)Arg-Pro-Gly-$NH_2$

Y-(O-THP)Ser-(O-Bzl)Tyr-Gly-Leu-($N^\omega$-$NO_2$)Arg-Pro-Gly-$NH_2$

Y-(O-MeOBzl)Ser-(O-Bzl)Tyr-Gly-Leu-($N^\omega$-$NO_2$)Arg-Pro-Gly-$NH_2$

Y-(O-Ac)Ser-(O-Bzl)Tyr-Gly-Leu-($N^\omega$-$NO_2$)Arg-Pro-Gly-$NH_2$

Y-(O-Bzl)Ser-(O-Z)Tyr-Gly-Leu-($N^\omega$-$NO_2$)Arg-Pro-Gly-$NH_2$

Y-(O-Bzl)Ser-(O-TRI)Tyr-Gly-Leu-($N^\omega$-$NO_2$)Arg-Pro-Gly-$NH_2$

Y-(O-Bzl)Ser-(O-Ac)Tyr-Gly-Leu-($N^\omega$-$NO_2$)Arg-Pro-Gly-$NH_2$

Y-(O-Bzl)Ser-(O-Tos)Tyr-Gly-Leu-($N^\omega$-$NO_2$)Arg-Pro-Gly-$NH_2$

Y-(O-Bzl)Ser-(O-THP)Tyr-Gly-Leu-($N^\omega$-$NO_2$)Arg-Pro-Gly-$NH_2$

Y-(O-Bzl)Ser-(O-tBu)Tyr-Gly-Leu-($N^\omega$-$NO_2$)Arg-Pro-Gly-$NH_2$

Y-(O-Bzl)Ser-(O-MeOBzl)Tyr-Gly-Leu-($N^\omega$-$NO_2$)Arg-Pro-Gly-$NH_2$ wherein Y is a suitable N^α-blocking group for serine that can be removed without affecting the aminoacid chain, Z stands for benzoxycarbonyl, THP means tetrahydropyranyl, tBu is tert.-butyl, MeOBzl is p-methoxybenzyl, Tos is tosyl (p-toluenesulfonyl), Ac is acetyl and TRI is triphenylmethyl. Other blocking groups that may be used include the trifluoroacetyl and other known alkyl groups that can be cleaved without affecting the desired peptide sequence. In all instances, N^ω of arginine may carry the tosyl group, benzyloxycarbonyl or similar protective groups in place of the above used nitro group. In each case, the reaction described above proceeds in the same fashion and all of the listed compounds may be converted to Gn-RH by condensation with N-BOC-Trp NPE, removal of the protective group, condensation with a N^α-protected histidine, removal of the protective group and condensation of the resulting nonapeptide with a suitable pyroglutamic acid ester. By proper selection of the protective groups on Ser, Tyr, Arg (and optionally on His), all of them may be removed simultaneously with hydrogen fluoride to yield Gn-RH, making these heptapeptides all equally useful precursors therefor.

Of course, the synthesis for the protected hexapeptide starting material described above has to be modified when making the hexapeptides carrying different protective groups on the N-arginyl or the tyrosyl moieties. Using the other respectively protected aminoacids in the shown sequence does not alter the synthesis described in a significant manner. The individual aminoacids carrying the above-shown protective groups including the N,O-diprotected serine are known in the art and are often used in peptide syntheses; they are described in the English edition of the textbook by Schröder et al., entitled The Peptides I (Academic Press 1965) on pages 167–174 for arginine, pages 210–212 for serine and pages 222–225 for tyrosine or in Peptides, Proceedings of the 9th European Peptide Symposium, edited by Beyerman (North-Holland Publishing Co., Amsterdam 1967) page 50 ff. for arginine.

I claim:

1. The heptapeptide Y-(O-R)Ser-(O-R')Tyr-Gly-Leu-(N^ω-R'')Arg-Pro-Gly-NH₂ wherein Y is hydrogen or tert.-butyloxycarbonyl and R, R' and R'' are hydrogen or protective groups which can be removed by one or more chemical treatments which do not affect the peptide chain.

2. The heptapeptide of claim 1 where Y is hydrogen.

3. The heptapeptide of claim 1 wherein Y is tert.-butyloxycarbonyl.

4. The heptapeptide of claim 1 wherein Y is tert.-butyloxycarbonyl or hydrogen, R and R' both are benzyl and R'' is NO₂.

5. The process of preparing the heptapeptide Y-(O-R)-Ser - (O - R')Tyr - Gly - Leu-(N^ω-R'')Arg-Pro-Gly-NH₂ wherein Y is an easily removable protective group attached to the amino-N of Ser and R, R' and R'' are protective groups which can be removed by one or more chemical treatments which do not affect the peptide chain, comprising treating the hexapeptide (O-R')-Tyr-Gly-Leu-(N^ω-R'')Arg-Pro-Gly-NH₂ with an excess of a compound of the formula

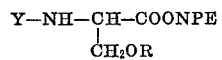

wherein R, R', R'' and Y are defined as above and NPE is the p-nitrophenyl group in the presence of an inert, polar, organic solvent at a temperature between 0° and 30° C. for a period of at least one hour and isolating the resulting heptapeptide from the reaction mixture.

6. The process of claim 5 wherein R and R' are benzyl, R'' is NO₂.

7. The process of claim 5 wherein Y is tert.-butyloxycarbonyl and R is benzyl.

8. The process of claim 5 wherein said inert, polar solvent is dimethylformamide.

References Cited

Baba et al.: Biochem. Biophys. Res. Comm. 44, 459 (July 16, 1971).

Matsuo et al.: Biochem. Biophys. Res. Comm., 1334 (June 18, 1971).

LEWIS GOTTS, Primary Examiner

R. J. SUYAT, Assistant Examiner